Jan. 24, 1956  H. SCHNEIDER  2,731,956
INTERNAL COMBUSTION ENGINE
Filed Aug. 12, 1952  4 Sheets-Sheet 1
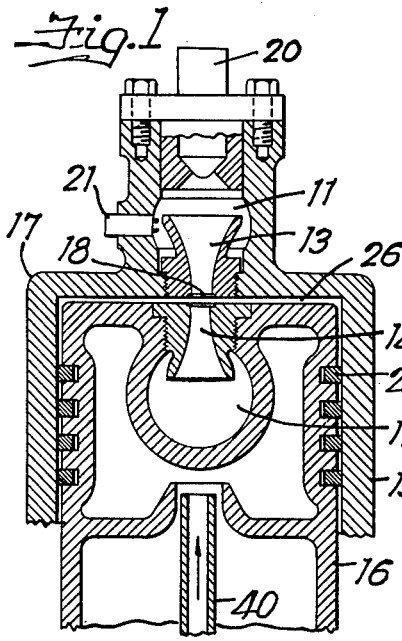
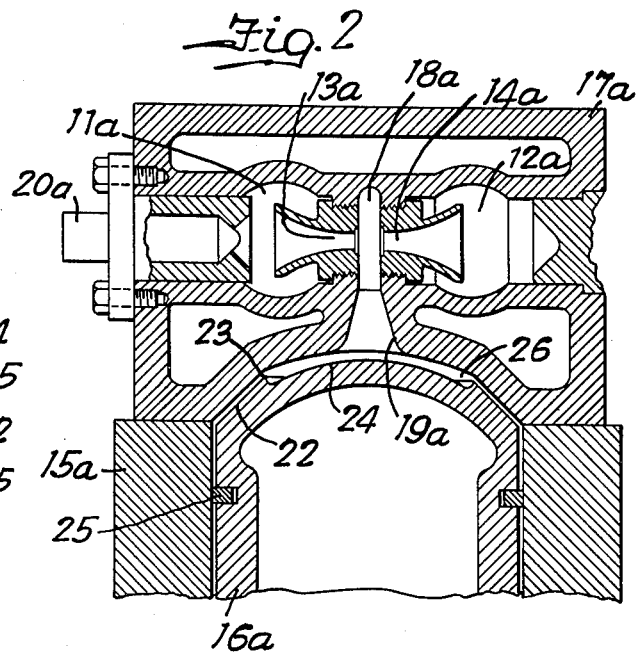
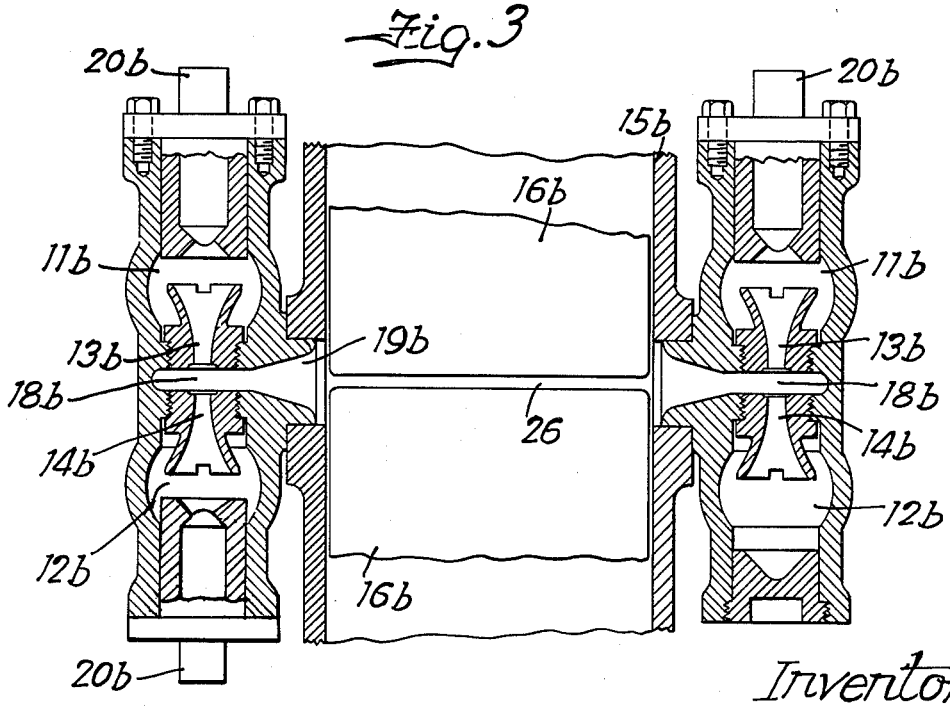
Inventor
Heinrich Schneider
Andrew F. Winterson
atty.

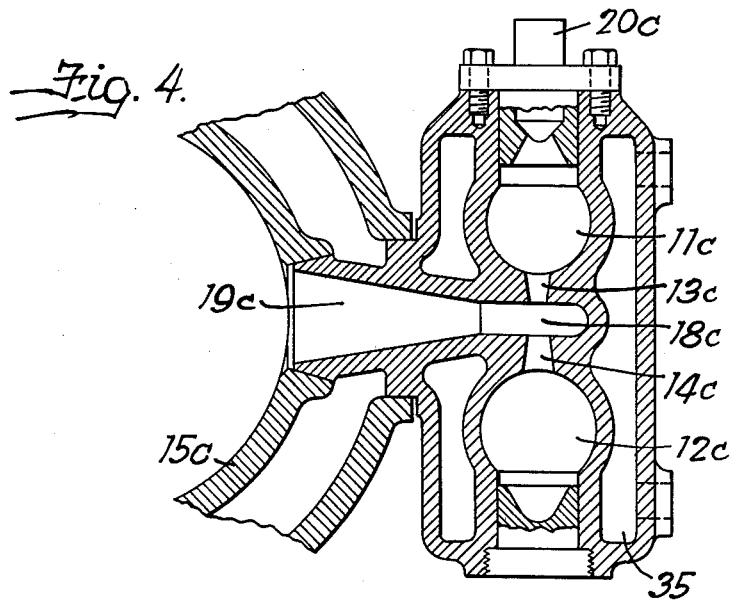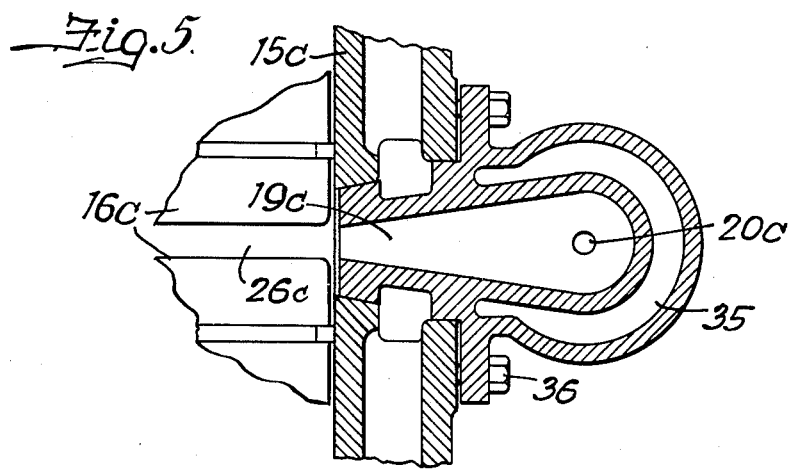

Jan. 24, 1956     H. SCHNEIDER     2,731,956
INTERNAL COMBUSTION ENGINE
Filed Aug. 12, 1952     4 Sheets-Sheet 3
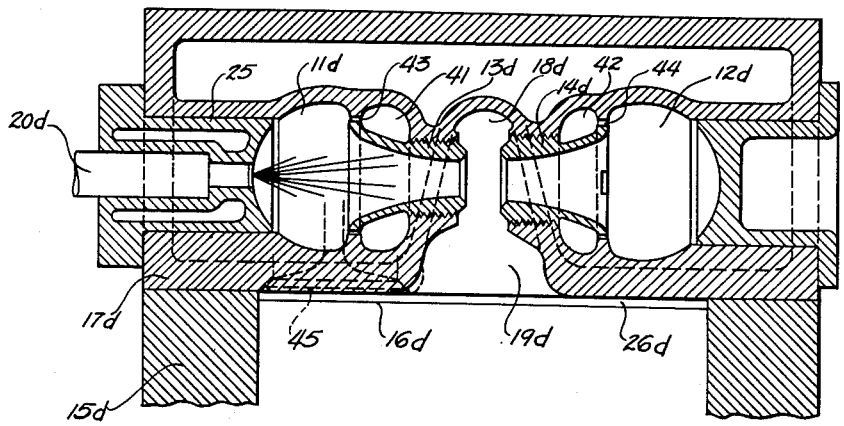
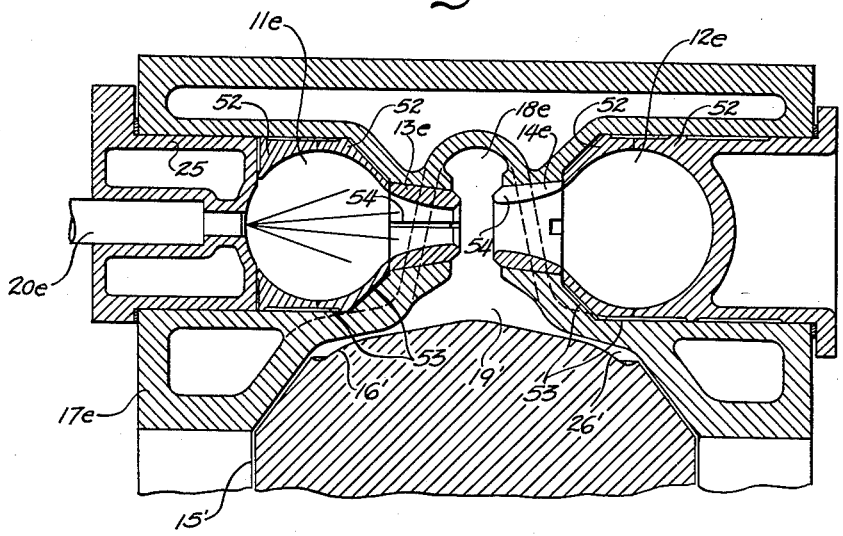
INVENTOR.
Heinrich Schneider
ATTY.

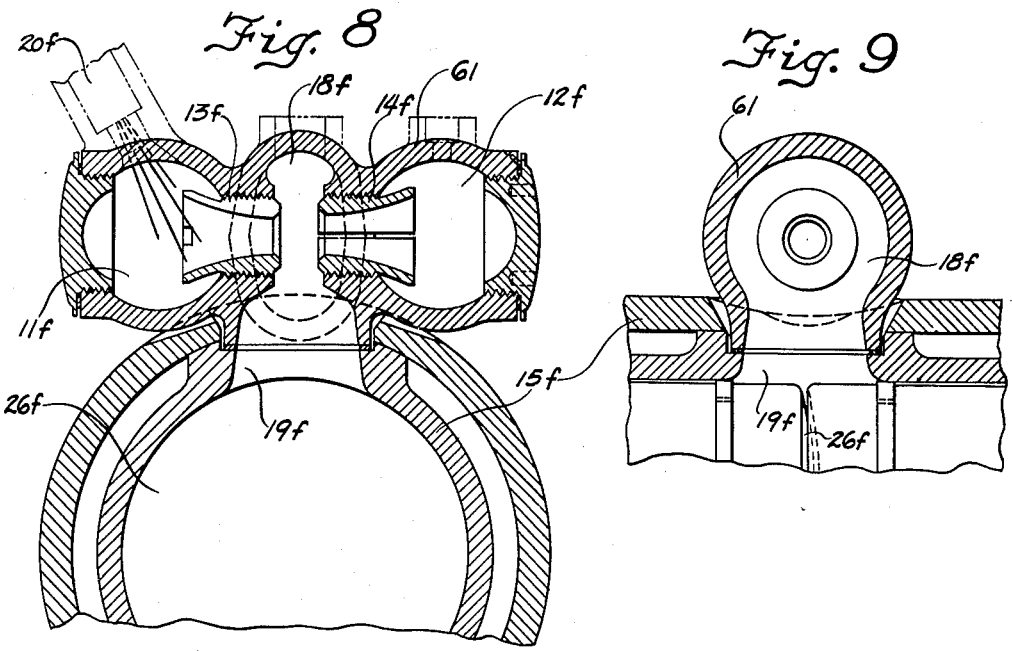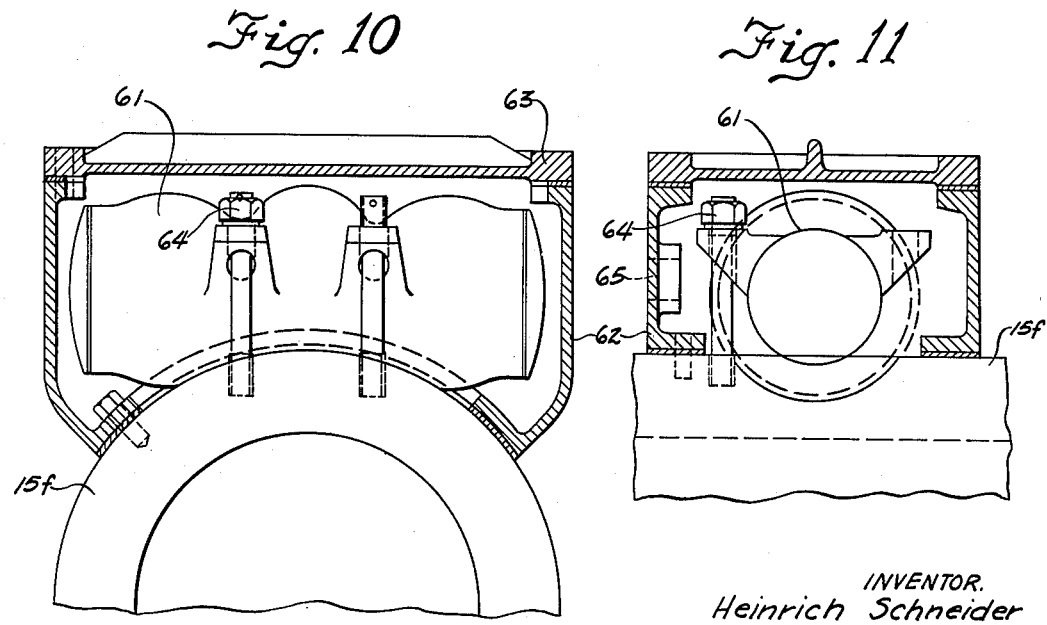

United States Patent Office 2,731,956
Patented Jan. 24, 1956

2,731,956
INTERNAL COMBUSTION ENGINE
Heinrich Schneider, Kittredge, Colo.

Application August 12, 1952, Serial No. 303,985

26 Claims. (Cl. 123—32)

This application is a continuation in part of my application, Serial No. 193,432, filed November 1, 1950, which has been abandoned.

This invention relates to combustion of fuel in internal combustion engines.

The principal object of the invention is to provide a method and means whereby more nearly perfect combustion is obtained in internal combustion engines, particularly for high speed and highly supercharged engines.

Another object of the invention is to provide an improved construction designed to operate so as to reduce the temperatures and peak pressures on top of the piston and piston rings.

Another object of the invention is to provide a new method of operation whereby to increase the rapidity of combustion by producing violent turbulence by means of high velocity air-fuel jets impinging upon each other, or blowing from one combustion chamber into another, or both, thereby creating a substantially perfect air-fuel mixture for faster and substantially complete combustion.

Other objects of the invention will appear in the course of the following description.

In high speed and highly supercharged engines, the pressure and temperature get so high that they have become generally recognized as a barrier to further increase of power capacity. Years ago, with low speed engines, the problem was to keep the heat losses small, whereas now, with high capacity internal combustion engines, the problem is to avoid too much heat and pressure, whereby to keep valves, pistons and rings at temperatures where they will operate satisfactorily in continuous operation. That is accomplished, in accordance with my invention, by transforming the internal combustion engine into an engine with external combustion.

A very important factor in this transformation from internal to external combustion is the matter of speeding up the combustion, because in the present high speed internal combustion engines the combustion is relatively so slow that it does not only continue over the expansion stroke but, in some cases, continues in the exhaust pipe. This speed-up of combustion is accomplished, in accordance with my invention, by the creation of violent turbulence produced by repeated back and forth jet action and impingement of jets so as to produce a more nearly perfect air-fuel mixture, which, in turn, results in extremely fast combustion.

Neither pre-combustion chamber, turbulence chamber, ante-chamber, nor energy-cell engines provide means to accomplish substantially complete combustion before the gas-fuel-air mixture reaches the cylinder proper and acts on the piston.

High firing pressure in open combustion chamber engines is the result of early injection, necessary for the inherently slow combustion in open chambers, to avoid after-burning and smoking. Such high pressure causes knocking and noisy operation, and necessitates heavy structural design.

High temperatures in combustion chambers and nozzles are dealt with, according to my invention, by the use of high heat-resistant material developed in the last decade for gas turbines. Appropriate liquid or air cooling keeps the temperature of combustion chambers and nozzles at safe operating ranges.

Flow losses in nozzles and energy losses for the creation of turbulence and heat losses to the walls of combustion chambers are more than balanced by the more nearly perfect and complete combustion obtained by my invention. Additional advantages that may be mentioned are less friction losses in piston rings and bearings, and less heat losses to piston and cylinder walls, resulting from lower pressure and temperature in the cylinder proper.

All types of fuel can be burned by the method and means of the invention, including Diesel fuel and distillates, cheap fuel and bunker oil, gasoline, butane and other gases. The engine can operate with compression ignition, and glow and spark plug ignition, the latter preferably for lower compression ratios or for starting. The peak firing pressures and temperatures are confined to the combustion chambers. The engine can operate with fixed nozzle mouth distance or variable distance.

The nozzles may operate at red or even white heat, particularly for operation with heavy fuel.

The engine can operate with a substantially constant pressure in the cylinder or at least with little pressure rise during combustion, compared with the excessive pressure rise in present high speed engines, similarly to the old air-injection engines.

The invention is illustrated in the accompanying drawings, in which—

Figs. 1, 2 and 3 show three different applications of a three-stage combustion, consisting in each case of a pre-combustion chamber and an ante-chamber on opposite sides of a nozzle mouth chamber that in each instance communicates with the cylinder space;

Figs. 4 and 5 show two sections of an independent three-stage combustion unit taken at ninety degrees to one another;

Fig. 6 is a section corresponding to a portion of Fig. 2, and showing another design and construction;

Fig. 7 is a view similar to Fig. 6 showing still another design and construction;

Figs. 8 and 9 are views similar to Figs. 4 and 5 showing further variations, and Figs. 10 and 11 are views related to Figs. 8 and 9 showing how the combustion unit is housed for water cooling.

Similar reference numerals are applied to corresponding parts in these views.

In the three-stage combustion of Fig. 1 is shown a pre-combustion chamber 11, an ante-chamber 12, nozzles 13 and 14, cylinder 15 and piston 16; also cylinder head 17, nozzle mouth chamber 18, fuel injector 20, and a glow or spark ignition plug 21. In Fig. 2, corresponding parts are numbered 11a, 12a, et cetera, and in Fig. 3, 11b, 12b, et cetera.

In Fig. 1, the precombustion chamber 11 is arranged in the cylinder head 17, and the ante-chamber 12 in the piston 16.

In Fig. 2, both chambers 11a and 12a, it will be observed, are arranged in the cylinder head 17a. The piston top consists of an upwardly inwardly tapered outer ring portion 22 ending in an edge 23 and a cupola-shaped inner portion 24 for a two-cycle port scavenging and port exhaust engine. The higher the supercharging, the more excess air, not necessary for combustion of the fuel, can be left between the piston and the cylinder head serving as a heat insulator, and, when the combustion gases flow into the cylinder, this relatively cooler air is pushed toward the piston rings 25, thus preventing to a great degree the hot gases from reaching the rings. Water injection, preferably into the ante-chamber 12a, may be used, particularly with aircraft engines.

In Fig. 3 chambers 11b and 12b are arranged sidewise with respect to cylinder 15b in an opposed-piston type engine having two pistons 16b. In the left hand combustion chamber arrangement, an injection nozzle 20b is provided in each chamber, injecting at the same time or one injecting earlier than the other, the air-fuel jets from opposite chambers impinging each other in the nozzle mouth chamber 18b creating violent turbulence for faster combustion.

The three-stage combustion shown in Fig. 1, for example, consists of two separate combustion chambers, 11 and 12, with a nozzle in each chamber, as at 13 and 14, arranged oppositely and adjacent to each other, each connecting the chamber with the power cylinder space 26, the one chamber 11 acting as a precombustion chamber, the other 12 as an ante-chamber. The ante-chamber 12 may be arranged in the piston, as in Fig. 1, or all three combustion stages may be removed from the piston, inside cylinder wall and valves, as in Figs. 2 and 3, so that neither the fuel nor the gas injection spray torch impinges thereon nor the main combustion heat center radiates heat from close proximity onto said vital parts.

In operation, referring to Fig. 2, for example, the pressure rise in the precombustion chamber 11a, caused by the injection of fuel by injector 20a close to the upper dead-center position of the piston 16a, produces a high velocity jet of gas, fuel and air mixture through the nozzle 13a into the ante-chamber 12a where a second combustion takes place, using the fresh air of the latter chamber to burn the blown-in fuel, and the resultant pressure rise produces a jet of gas, fuel and air mixture through its nozzle 14a in the opposite direction back toward and into the precombustion chamber 11a, where further combustion may take place, the jets blowing back and forth between the two chambers until the pressure in the chambers is balanced. Because the nozzles 13a and 14a are arranged in substantially coaxial relation and facing each other with their mouths closely juxtaposed opening into opposite sides of the nozzle mouth chamber 18a, the major portion of the fuel of a jet of fuel-air mixture and combustion gas is blown from one combustion chamber into the other. During the expansion stroke of the piston 16a, both chambers blow a portion of their contents through their nozzles 13a—14a against each other, creating violent turbulence in the nozzle mouth chamber 18a, so that the rest of the fuel or gas is burned in this third-stage combustion in the nozzle mouth chamber 18a. Even early injection of fuel in the precombustion chamber 11a, causing high pressure, does not substantially increase the pressure in the cylinder 15a on the piston 16a during the combustion in the precombustion chamber 11a and the ante-chamber 12a. The pressure rise in both chambers is converted to velocity energy, blowing from one chamber into the other, thus causing faster combustion, with little effect upon pressure and heat in the cylinder proper. Only at the third stage of combustion in the nozzle mouth chamber 18a, when both chambers 11a and 12a discharge and blow the rest of the unburned fuel and air mixture against each other, completing the combustion in the nozzle mouth chamber 18a between the nozzles, does the pressure-rise, caused by the increase in volume of the hot gases, extend into the cylinder 15a. However, at this time the piston 16a is already on its down-stroke, so that the indicator diagram will show only relatively little pressure rise. Engines employing this improved method of combustion will operate smoothly and quietly.

In Figs. 4 and 5, I have shown an independent three-stage combustion chamber unit with chambers and nozzles, similarly as shown in Figs. 2 and 3. The unit includes a water jacket 35 and is attached by means of screws 36 to the cylinder 15c. Forced high velocity liquid or air cooling of the combustion chamber walls and nozzles is preferably provided, as indicated, for example, at 40 in Fig. 1, together with cooling ribs, like those provided on air cooled engines, on very high power capacity engines.

Fig. 6 shows a cylinder head 17d of an internal combustion engine, including a precombustion chamber 11d, ante-chamber 12d, nozzles 13d and 14d connecting said two chambers 11d and 12d with the nozzle mouth chamber 18d which connect by a funnel-shaped throat 19d with the cylinder space proper numbered 26d. Secondary air chambers 41 and 42 are arranged like a torus around the nozzles 13d and 14d respectively, formed by the nozzle and the cooled chamber wall, connecting with the main chambers 11d and 12d by means of narrow circular slots 43 and 44. Valves 45 indicated in dotted lines are arranged in the cylinder head 17d functioning as intake or exhaust valves.

In operation, briefly stated, during the compression stroke, the air is moved through throat 19d into nozzle mouth chamber 18d, and thence through nozzles 13d and 14d into the combustion chambers 11d and 12d, and from these chambers part of the air is forced through slots 43 and 44 into the secondary chambers 41 and 42. When injector 20d injects fuel into the precombustion chamber 11d and into the wide end of nozzle 13d, combustion takes place and the resulting pressure increase ejects the air-fuel-gas mixture through the nozzle 13d and through nozzle 14d into ante-chamber 12d, where a second explosion-like combustion takes place. The fuel globules blown into the ante-chamber 12d by the gas jet from the precombustion chamber 11d at extremely high velocity penetrating the compressed air in chamber 12d are torn to shreds forming a perfect mixture for combustion. The resulting pressure rise is converted again into velocity in nozzle 14d ejecting through nozzle 13d back into the precombustion chamber, while part of the jet may be reflected at the mouth of the nozzle 13d into chamber 18d, where fresh air is available for burning gas and fuel carried with the jet. The jet penetrating into the precombustion chamber again, will cause further combustion of excess fuel and gas in this chamber. The orifice in nozzle 14d is purposely made larger than the orifice in nozzle 13d, so that the first jet out of nozzle 13d into nozzle 14d acts as an injector in nozzle 14d and carries with it additional fresh air from chamber 18d into chamber 12d. While the combustion takes place in the two main combustion chambers 11d and 12d, and the fuel is injected substantially into the central area of these chambers, the pressure increase in these chambers naturally forces more air with a minor amount of fuel into the secondary air chambers 41 and 42, in which there remains an excess amount of air. After the initial combustions and the passing of gas jets from one chamber into the other, forth and back, the piston is on its downward stroke and both chambers 11d and 12d eject gas-fuel-air jets impinging upon each other at the nozzle mouths, creating violent turbulence for good mixture and combustion, the combustion gases spreading out into chamber 18d, and outwardly through throat 19d into the cylinder space proper numbered 26d. The liquid fuel injected is, of course, completely gasified in the operation just described, and if there still remains any unburned fuel in the gas stream into the cylinder 26d, it will burn in the cylinder like a gas-air mixture in any ordinary gasoline engine. But there still may remain in the chambers 11d and 12d some unburned fuel and gas, which, unless burned immediately with the rest of each charge, would only pass with the combustion gas in the cylinder during the downward stroke of the piston. In order to burn this remaining fuel in the combustion chambers 11d and 12d early in the down-stroke the secondary air chambers 41 and 42 are provided, which contain excess air after the main combustions have taken place and with the decrease in pressure during the down-stroke of the piston, this air blows back from the secondary into the main chambers and burns the excess fuel in these chambers. The secondary air chambers 41 and 42 also act as heat insulation chambers, to reduce the loss of heat to the cooling medium. During the end portion of the compression stroke the velocity of compressed air flowing into the precombustion chamber 11d through the nozzle 13d reaches its maximum and is enough to tear even a relatively solid fuel jet into shreds, so that fuel injected against and into this air jet is carburized and mixed thoroughly with the air. The fuel spray is preferably directed substantially toward or into the center of the nozzle 13d, so as to be caught by the incoming air jet and be carried along by the reversed jet into the ante-chamber 12d.

Fig. 7 shows the same basic design of the three combustion chambers, namely, the precombustion chamber 11e, the ante-chamber 12e, the nozzle mouth chamber 18e, with nozzles 13e and 14e and injector 20e. Injector 20e is located in a water cooled housing 25e inserted in cylinder head 17e. The two main combustion chambers 11e 12e are lined with heat resistant material 52 made up of several parts each having small area contact with the cooled chamber walls leaving thin air spaces 53 between the greater area of the liners and the cooled wall. The nozzles 13e and 14e are inserted in the throats of the chambers with a conical fit for easy removal and a tight wedging fit to facilitate heat transfer to the cooled wall. The nozzles are split lengthwise, each having one narrow longitudinal slot 54 and being pressed into position and held there by the liners 52.

The nozzles 13d and 14d in Fig. 6 have a tapered or pipe thread for threading in the throat of the chambers and are preferably also slotted lengthwise like the nozzles shown in Fig. 7. The slots 54 provide a spring-type self-locking action.

Figs. 8 and 9 show a combustion chamber unit 61 attached to the cylinder 15f of an opposed-piston engine. The combustion unit comprises a precombustion chamber 11f, an ante-chamber 12f, a nozzle mouth chamber 18f with funnel-shaped throat 19f connecting all three chambers with the cylinder space proper numbered 26f. Nozzles 13f and 14f are provided in the two main combustion chambers and an ejector 20f is arranged at an angle to the nozzle axes in the precombustion chamber 11f.

Figs. 10 and 11 show the combustion unit 61, surrounded by a housing 62 attached to cylinder 15f with a watertight cover 63, fluid for cooling the unit being conducted into and out of housing 62 through openings 65. When cover 63 is removed, nuts 64 are accessible and may be removed to permit removal of unit 61 from the cylinder.

The operation of the designs of engines disclosed in Figs. 6–11 will now be described in greater detail. In standard precombustion chamber engines small nozzle orifices are required to produce good combustion by high velocity fuel-air jets penetrating and distributing fuel over the usual rather flat main combustion chamber above the piston, thereby wasting a substantial amount of power during the compression stroke in pushing air through the small orifice. In the present invention, however, the precombustion chamber, 11d for example, blows its fuel-air mixture into the ante-chamber, 12d for example, where the air is concentrated in a compact space, preferably of spherical form into which the air-fuel jet penetrates. Nozzle orifices in both combustion chambers can therefore be kept relatively large to reduce losses due to the power required to force the air through the nozzles during the compression stroke and blowout period. Long streamlined nozzle orifices are preferably used, to produce compact penetrating gas jets, with relatively large orifices. The orifice in the precombustion nozzle, 13d for example, is made smaller than the one (14d for example) of the ante-chamber, so that the jet blowing out of the precombustion chamber nozzle 13d goes through the orifice of the ante-chamber nozzle 14d without touching its mouth and acting in the nozzle 14d as an injector, drawing additional air from the nozzle mouth chamber 18d into the ante-chamber 12d. The nozzle orifice diameters are preferably made within the following limits:

In the precombustion chamber____ 3 to 15% of cylinder diameter.
In the ante-chamber_____ 5 to 20% larger than in the precombustion chamber.

The nozzles 13d and 14d connect the two combustion chambers 11d and 12d with the cylinder by means of the nozzle mouth chamber, 18d for example, which constitutes the third combustion chamber, that is funnel-shaped diverging toward the cylinder proper to reduce flow losses during compression by gradually increasing the air velocity into the combustion chambers and reducing gas velocity from the combustion chambers into the cylinder proper. The liquid fuel is substantially completely converted into gas after it has been repeatedly blasted from one combustion chamber into the other, due to the violent turbulence and high combustion heat so that any remaining unburned gas flowing into the cylinder proper and mixed with the air, which remained in the clearance space of the cylinder, is immediately burned like gas in a carburation engine. To reduce heat losses in the combustion chambers to the cooling fluid and to keep the internal wall of the combustion chambers at higher temperature, insulating heat resistant linings are provided in the combustion chambers, as shown at 52 for example, thereby assisting ignition of the injected fuel and thoroughly burning heavy fuels. The heat absorbed in the lining of the combustion chamber wall will heat up the incoming air during the compression stroke, thereby making heat transmitted to the lining in each previous combustion available in the new cycle, so that heat losses are greatly reduced. The temperature of the lining can be controlled by providing more or less contact with the cooled wall and more or less air spaces 53.

The nozzles 13d and 14d, for example, are made of heat and corrosion-resisting material, or of high heat-conducting material like copper, with the orifice chromium-plated or stellite-lined or provided with other corrosion resisting linings. The nozzle threads are preferably copper plated to facilitate the conduction of heat from the nozzle to the cooled chamber walls. The nozzle reaches with the diverging end into the combustion chamber, with small area section close to the contact section with the wall, to keep the protruding free end of the nozzle hot to facilitate ignition.

Complete and efficient combustion in diesel engines with very high rotating speeds can hardly be obtained without the use of air-fuel turbulence by partial combustion. It is the repeated blasts of jets and violent turbulence of impinging jets which causes perfect mixture of fuel and air in my invention. Naturally that could not be accomplished in the cylinder proper, only external combustion can provide the means. Higher engine speeds require faster combustion and high supercharging demands external combustion. The invention uses a method of combustion by forcing air-fuel mixture repeatedly through nozzles with high velocity to produce by violent turbulence thorough fuel air mixture.

My combustion chamber arrangement can be used also for engines with lower compression than Diesel engines require, with spark or heat coil-ignition in the precombustion chamber, so that the maximum combustion pressure can be kept so low that standard gasoline engine construction can be used.

It is believed the foregoing description conveys a good understanding of the objects and advantages of my invention. The appended claims have been drawn to cover all legitimate modifications and adaptations.

I claim:

1. An internal combustion engine comprising a power cylinder and a piston reciprocable therein, the combination of a precombustion chamber into which the fuel is injected, and an ante-combustion chamber, each having a nozzle, the orifice of each nozzle connecting its respective chamber with the cylinder, the nozzles being in spaced substantially coaxial relation with the mouths of said nozzles arranged in such close proximity that the major portion of the fuel of the jet of fuel, air and gas from the nozzle of either chamber can enter the opposite chamber through the orifice in its respective nozzle.

2. An engine as set forth in claim 1, wherein the orifice of the ante-chamber is larger than the orifice of the precombustion chamber.

3. A combustion chamber unit for use with the working cylinder space of an internal combustion engine, consisting of a precombustion chamber and an ante-chamber and a nozzle mouth chamber therebetween and arranged to communicate with the working cylinder space, the first two chambers each having a nozzle, the nozzles being in juxtaposed closely spaced substantially coaxial relation.

4. An internal combustion engine comprising two combustion chambers separately arranged from the working cylinder space and in opposed relationship to one another, each of said two combustion chambers having a nozzle, and a nozzle mouth chamber between said combustion chambers into which the mouths of said nozzles open, said nozzle mouth chamber communicating with the working cylinder, said nozzles being arranged in substantially coaxial relation and facing each other and having their juxtaposed orifice mouths arranged so close to each other on opposite sides of said nozzle mouth chamber that the major portion of the fuel of a jet of fuel-air mixture and combustion gas blown out from one combustion chamber will enter the opposed combustion chamber, one of said combustion chambers operating as a pre-combustion chamber in which the fuel-air mixture is originally ignited, resulting in a pressure increase, whereby a high velocity jet of the fuel-air mixture and combustion gas is produced by partial combustion in one of said chambers and is blown from said one combustion chamber into the opposed combustion chamber and from the latter back into the first combustion chamber, and jets from both combustion chambers are blown head-on against each other during the expansion stroke producing repeated violent turbulence of the mixture of fuel and air for fast and complete combustion.

5. An engine as set forth in claim 4, wherein said two combustion chambers form the major volume of the compression space, the piston clearance space being kept as small as possible.

6. An engine as set forth in claim 4, wherein said two combustion chambers form the major volume of the compression space, the piston clearance space being kept as small as possible and the nozzle mouth chamber being provided only as large as necessary for the flow of air and gas through the nozzle mouth chamber with low flow losses.

7. An engine as set forth in claim 4, wherein the nozzles have tapered bores which converge toward the nozzle mouth chamber and diverge toward said combustion chambers.

8. An engine as set forth in claim 4, including a fuel injection nozzle in one of said chambers.

9. An engine as set forth in claim 4, wherein the discharge orifice of each of said combustion chambers is in the range between 3.0 and 15.0 per cent of the power cylinder diameter, the orifice of the nozzle of one of said combustion chambers being larger than the orifice of the nozzle of the other combustion chamber.

10. An engine as set forth in claim 4, wherein said combustion chambers are arranged on the side of the cylinder.

11. An engine as set forth in claim 4, wherein said combustion chambers are arranged outside of the cylinder proper, there being at least one set of said combustion chambers on said cylinder.

12. An engine as set forth in claim 4, wherein said nozzle orifices are elongated and streamline-shaped diverging from the nozzle mouth chamber into the associated combustion chamber, the orifice of one of said combustion chamber nozzles being of smaller diameter than the nozzle orifice of the other combustion chamber, whereby to cause an injector action into the latter chamber.

13. An engine as set forth in claim 4, wherein the nozzle mouth chamber has a funnel-shaped portion diverging toward the power cylinder.

14. An engine as set forth in claim 4, including ignition means in one of said chambers.

15. An engine as set forth in claim 4, including a fuel injector in each of said combustion chambers.

16. An engine as set forth in claim 4, including a cylinder head, and wherein one of said combustion chambers is a pre-combustion chamber provided in said cylinder head, while the other combustion chamber is an ante-chamber provided in the piston.

17. An engine as set forth in claim 4, including a cylinder head, and wherein said combustion chambers are arranged outside of the cylinder proper in the cylinder head.

18. An engine as set forth in claim 4, in which at least one of said combustion chambers is provided with a secondary air chamber connected with said combustion chamber by a relatively small area passage.

19. An engine as set forth in claim 4, wherein said secondary air chamber is substantially torus-shaped and arranged around said nozzle.

20. An engine as set forth in claim 4, wherein at least one of said combustion chambers is lined with heat-insulating heat-resistant material.

21. An engine as set forth in claim 4, wherein said nozzles are split lengthwise and are tapered externally and have a wedging fit in a tapered opening provided in the combustion chamber wall.

22. An engine as set forth in claim 4, wherein said combustion chambers are provided exteriorly of said cylinder as an independent unit, and cooling means therefor.

23. An internal combustion engine comprising a power cylinder and a piston reciprocable therein, the combination of a precombustion chamber in which the fuel is ignited, and an ante-combustion chamber, each having a nozzle, the orifice of each nozzle connecting its respective chamber with the cylinder, the nozzles being in spaced substantially coaxial relation with the mouths of said nozzles arranged in such close proximity that the major portion of the fuel of the jet of fuel, air and gas from the nozzle of either chamber can enter the opposite chamber through the orifice in its respective nozzle.

24. An internal combustion engine comprising two combustion chambers separately arranged from the working cylinder space and in opposed relationship to one another, each of said two combustion chambers having a nozzle, and a nozzle mouth chamber between said combustion chambers into which the mouths of said nozzles open, said nozzle mouth chamber communicating with the working cylinder, said nozzles being arranged in substantially coaxial relation and facing each other and having their juxtaposed orifice mouths arranged so close to each other on opposite sides of said nozzle mouth chamber that the major portion of the fuel of a jet of fuel-air mixture and combustion gas blown out from one combustion chamber will enter the opposed combustion chamber, one of said combustion chambers operating as a pre-combustion chamber into which the fuel is injected, resulting in a pressure increase, whereby a high velocity jet of the fuel-air mixture and combustion gas is produced by partial combustion in one of said chambers and is blown from said one combustion chamber into the opposed combustion chamber and from the latter back into the first combustion chamber, and jets from both combustion chambers are blown head-on against each other during the expansion stroke producing repeated violent turbulence of the mixture of fuel and air for fast and complete combustion.

25. In an internal combustion engine, means providing for combustion external to a working cylinder to which the peak pressure and peak temperature are confined, said means including a precombustion chamber in which fuel is ignited, an ante-chamber into which some of the fuel is discharged from the precombustion chamber upon initial combustion occurring in the precombustion chamber, and a third combustion chamber between and communicating with both of the aforesaid chambers and the cylinder in which final combustion occurs after back and forth discharges of fuel between the aforesaid chambers.

26. In an internal combustion engine, the combination with the working cylinder, of means separate from the cylinder space to which the peak pressure and peak temperature are confined defining a precombustion chamber in which fuel is ignited, means also separate from the cylinder space defining an ante-chamber, said chambers having separate communication with the working cylinder space, means whereby fuel and fuel-air mixture and combustion gas are blown from one of said chambers into the other and back again repeatedly in the combustion of the fuel outside the cylinder space, and means whereby the pressure upon equalization between said chambers is transmitted to a piston or pistons in the working cylinder.

References Cited in the file of this patent

UNITED STATES PATENTS

| | | |
|---|---|---|
| 1,406,877 | Lemaire | Feb. 14, 1922 |
| 1,594,773 | French | Aug. 3, 1926 |
| 1,877,737 | Goldberg | Sept. 13, 1932 |
| 2,071,241 | Thomas | Feb. 16, 1937 |
| 2,157,658 | Fischer | May 9, 1939 |

FOREIGN PATENTS

| | | |
|---|---|---|
| 714,411 | France | Nov. 19, 1931 |
| 404,838 | Great Britain | Jan. 25, 1934 |
| 614,084 | Germany | June 3, 1935 |
| 622,478 | Germany | Nov. 29, 1935 |